United States Patent
Langtry et al.

(10) Patent No.: US 12,437,882 B2
(45) Date of Patent: Oct. 7, 2025

(54) CENTRAL COLUMN DESIGNS FOR TOKAMAKS

(71) Applicant: Tokamak Energy Ltd, Abingdon (GB)

(72) Inventors: Tony Langtry, Abingdon (GB); Robert Slade, Abingdon (GB); Marcel Kruip, Abingdon (GB)

(73) Assignee: Tokamak Energy Ltd, Abingdon (GB)

(*) Notice: Subject to any disclaimer, the term of this patent is extended or adjusted under 35 U.S.C. 154(b) by 1058 days.

(21) Appl. No.: 16/965,799

(22) PCT Filed: Jan. 30, 2019

(86) PCT No.: PCT/GB2019/050246
§ 371 (c)(1),
(2) Date: Jul. 29, 2020

(87) PCT Pub. No.: WO2019/150096
PCT Pub. Date: Aug. 8, 2019

(65) Prior Publication Data
US 2021/0043333 A1    Feb. 11, 2021

(30) Foreign Application Priority Data
Jan. 31, 2018 (GB) .................................. 1801545

(51) Int. Cl.
*G21B 1/05* (2006.01)
(52) U.S. Cl.
CPC .................................. *G21B 1/057* (2013.01)
(58) Field of Classification Search
CPC ............. G21B 1/057; G21B 1/11; G21B 1/21
USPC ........................................ 376/133, 142, 150
See application file for complete search history.

(56) References Cited

U.S. PATENT DOCUMENTS

| | | | | |
|---|---|---|---|---|
| 3,736,539 A | * | 5/1973 | File | H05H 1/12 505/879 |
| 4,560,528 A | * | 12/1985 | Ohkawa | G21B 1/052 376/121 |
| 4,749,540 A | * | 6/1988 | Bogart | G21B 1/11 976/DIG. 1 |

(Continued)

FOREIGN PATENT DOCUMENTS

| | | | |
|---|---|---|---|
| CN | 1797613 A | * | 7/2006 |
| DE | 2952980 A1 | | 12/1980 |

(Continued)

OTHER PUBLICATIONS

Voss, G. M., et al. "A conceptual design of a spherical tokamak power plant." Fusion engineering and design 51 (2000): 309-318. (Year: 2000).*

(Continued)

*Primary Examiner* — Jinney Kil
(74) *Attorney, Agent, or Firm* — Michael Best & Friedrich LLP

(57) ABSTRACT

There is described a central column for a toroidal field coil of a tokamak plasma chamber. The central column comprises a support member extending vertically along a central axis of the central column made from material with high compressive strength, and current carrying elements located radially outward of the support member. The support member is in structural contact with the current carrying elements so as to support them radially against compressive Lorentz stress.

5 Claims, 4 Drawing Sheets

(56) References Cited

U.S. PATENT DOCUMENTS

| | | | |
|---|---|---|---|
| H627 H | * | 4/1989 | Peng |
| 2016/0232988 A1 | * | 8/2016 | Sykes .................. G21B 1/057 |

FOREIGN PATENT DOCUMENTS

| | | | | |
|---|---|---|---|---|
| GB | 2043987 | B | | 9/1982 |
| GB | 2174836 | A | | 11/1986 |
| JP | S59102187 | A | | 6/1984 |
| JP | S63184089 | A | | 7/1988 |
| JP | S63191093 | A | | 8/1988 |
| JP | 2000171578 | A | * | 6/2000 |
| KR | 100805681 | B1 | * | 2/2008 |
| KR | 20090002771 | A | * | 1/2009 |
| WO | WO-2016027058 | A1 | * | 2/2016 ............. G21B 1/057 |

OTHER PUBLICATIONS

International Preliminary Report on Patentability for Application No. PCT/GB2019/050246 dated Aug. 13, 2020 (8 pages).
Search Report issued by the United Kingdom Intellectual Property Office for Application No. 1801545.3 dated Aug. 1, 2018 (4 pages).
International Search Report and Written Opinion for Application No. PCT/GB2019/050246 dated Mar. 20, 2019 (12 pages).
Rebut, "ITER: the first experimental fusion reactor," Fusion Engineering and Design, 1995, vol. 27, pp. 3-16.
Sykes et al., "The START spherical tokamak," 16th IEE/NPSS Symposium on Fusion Engineering, 1995, pp. 1442-1446.

* cited by examiner

CENTRAL COLUMN DESIGNS FOR TOKAMAKS

FIELD OF THE INVENTION

The present invention relates to tokamak fusion reactors. In particular, it relates to improvements to the central column of such reactors.

BACKGROUND

A tokamak features a combination of strong toroidal magnetic field, high plasma current and, usually, a large plasma volume and significant auxiliary heating, to provide hot, stable plasma. This allows tokamaks to generate conditions so that fusion can occur. The auxiliary heating (for example via tens of megawatts of neutral beam injection of high energy H, D or T) is necessary to increase the temperature to the sufficiently high values required for nuclear fusion to occur, and/or to maintain the plasma current.

The problem is that, because of the large size, large magnetic fields, and high plasma currents generally required, build costs and running costs are high and the engineering has to be robust to cope with the large stored energies present, both in the magnet systems and in the plasma, which has a risk of 'disrupting'—mega-ampere currents reducing to zero in a few thousandths of a second in a violent instability.

The situation can be improved by contracting the donut-shaped torus of a conventional tokamak to its limit, having the appearance of a cored apple—the 'spherical' tokamak (ST). The first realisation of this concept in the START tokamak at Culham demonstrated a huge increase in efficiency—the magnetic field required to contain a hot plasma can be reduced by a factor of 10. In addition, plasma stability is improved, and building costs reduced.

To obtain the fusion reactions required for economic power generation (i.e. much more power out than power in), a conventional tokamak would have to be huge so that the energy confinement time (which is roughly proportional to plasma volume) can be large enough that the plasma can be hot enough for thermal fusion to occur.

WO 2013/030554 describes an alternative approach, involving the use of a compact spherical tokamak for use as a neutron source or energy source. The low aspect ratio plasma shape in a spherical tokamak improves the particle confinement time and allows net power generation in a much smaller machine. However, a small diameter central column is a necessity, which presents challenges for design of the plasma confinement vessel and associated magnets.

The magnet coils on a tokamak can be divided into two groups. The poloidal field coils are horizontal circular coils wound with their centre lying on the central column of the tokamak, and produce a poloidal field (i.e. one which is substantially parallel to the central column). The toroidal field coils are wound vertically through the central column, and around the outside of the plasma chamber (the "return limbs") to produce a toroidal field (i.e. one which is circular around the central column). The combination of the poloidal and toroidal fields produces a helical field within the plasma chamber which keeps the plasma confined.

The currents required in the toroidal field are very large. For a compact spherical tokamak, the central column should be as small in diameter as possible. This presents conflicting requirements, as the current density which can be achieved, even with superconducting materials, is limited. A cross section of an exemplary central column 100 is shown in FIG. 1. Current carrying elements 101 are arranged as several busbars. In non-superconducting toroidal field coils, the current carrying elements are typically made from copper. In superconducting toroidal field coils, the current carrying elements comprise high temperature superconductor (HTS) and/or low temperature superconductor (LTS) material, normally within a copper cladding for electrical and thermal stabilisation. As well as the current carrying elements, space in the central column is taken up by non-current carrying components. These non-current carrying components include:
- neutron shielding 102—required to reduce heating and degradation of the conductors in the central column, especially where superconducting materials are used;
- electrical insulation 103—required to isolate the busbars 101 from each other;
- coolant channels 104—required to carry heat away from the central column (e.g. using a cryogen);
- cooling ribs 105—required to carry heat from the individual busbars to the coolant channels 104. These are usually formed from copper.

SUMMARY

In accordance with one aspect of the present invention there is provided a central column for a toroidal field coil of a tokamak plasma chamber. The central column comprises a support member extending vertically along a central axis of the central column made from material with high compressive strength, and current carrying elements located radially outward of the support member. The support member is in structural contact with the current carrying elements so as to support them radially against compressive Lorentz stress.

The support member may be tubular and may include a coolant channel there within.

Electrical insulation may be provided around each current carrying element, and cooling ribs in thermal contact with the electrical insulation. The cooling ribs may extend through the support member into the coolant channel.

The support member may be formed from steel, Inconel and/or titanium, and/or a carbon composite, and/or a ceramic such as tungsten carbide.

The invention also provides a toroidal field coil for a tokamak, the toroidal field coil comprising a central column as described above. The invention also provides a tokamak comprising such a toroidal field coil.

DETAILED DESCRIPTION

One issue which must be considered in a tokamak is the stress on the superconducting core. This stress arises from the Lorentz force acting on the conductors. In the centre column the conductors carry axial current in an azimuthal magnetic field, and hence experience a force acting towards the centre of the column. These Lorentz forces act radially to compress the centre column, leading to compressive hoop and radial stresses. The return limbs are also subject to forces acting in the direction of the axis of the column. Where these are transferred to the centre column, they can produce axial tension in it. However, these axial forces arising from the return limbs can be supported by external structures.

In a spherical tokamak, there is no space for coolant channels in the current carrying elements (core conductors). These are therefore made from copper with embedded HTS tapes, as described in PCT/GB2017/053065. A high fraction of copper is needed for quench protection (i.e. to temporarily carry the current if one or more HTS tapes quench, as described in PCT/GB2017/053065). The conductors may be electrically insulated from one another with material sufficient to withstand voltages induced during a quench. Heat deposited in these conductors (e.g. from neutron heating, current sharing around cracks in the HTS, or during the onset of a quench) is conducted radially through the turns to an external annulus 104 carrying cryogenic coolant, for example, helium gas at high pressure (typically 15 bar) and low temperature (eg: 15 K), as previously discussed and shown in FIG. 1. The central column is thus primarily made from copper (in particular, the cooling ribs and current carrying elements are primarily copper—in superconducting central columns the superconducting material is normally provided within copper cladding for thermal and electrical stabilisation).

The yield stress of copper depends on its purity and the degree of work hardening. Since the magnetic field in the central column is high, the resistivity of copper is dominated by magnetoresistance, and little advantage is gained by using a high purity copper, as often specified for use in magnets. In the following description it is therefore assumed that fully hard copper is used. This has a yield stress of approximately 350 MPa. Allowing a reasonable safety margin, the maximum acceptable limit for stress in the centre column is therefore roughly 250 MPa.

Figure 2A:
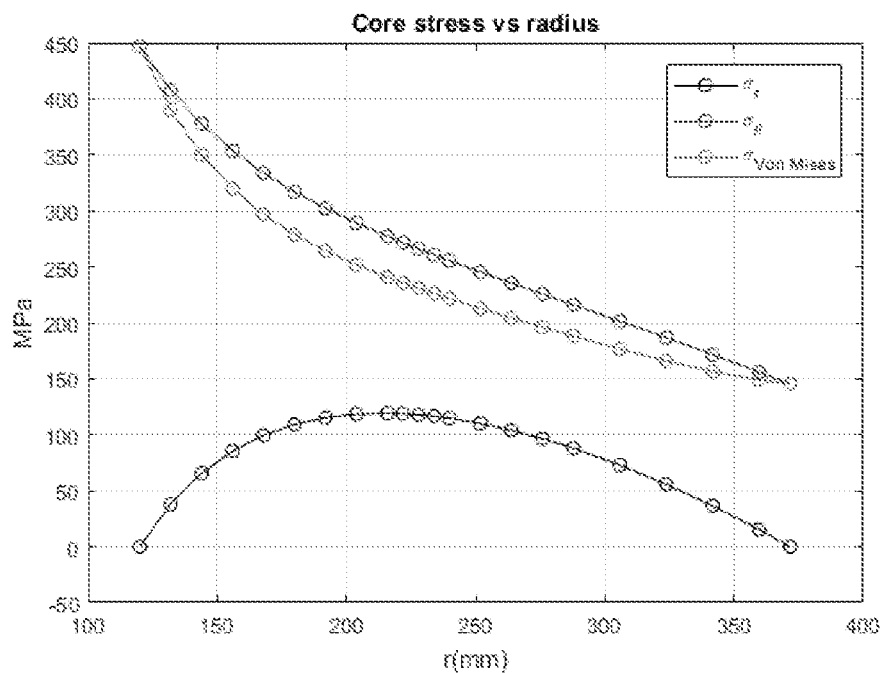
FIG. 2A is a graph of the stress in the central column of FIG. 1.

FIG. 2A shows a plot of radial (or), hoop (Go), and Von Mises stress in the centre column as a function of radius for a notional spherical tokamak generating 3.5 T at 2 m major radius. The centre column must carry 35 MA to generate this field. The inner radius of the superconducting core is assumed to be 120 mm. This value is chosen because it becomes hard to package the tapes into the narrow sectors if a lower inner radius is chosen, so we are forced to accept this rather large hole in the core for practical assembly reasons. The superconducting core is modelled as 100% copper taking Young's modulus as 130 MPa and 0.3 for Poisson's ratio. Assuming a uniform current density of 90 A/mm$^2$ the outer radius of the core is 370 mm. This current density is chosen by quench protection considerations.

Figure 1:
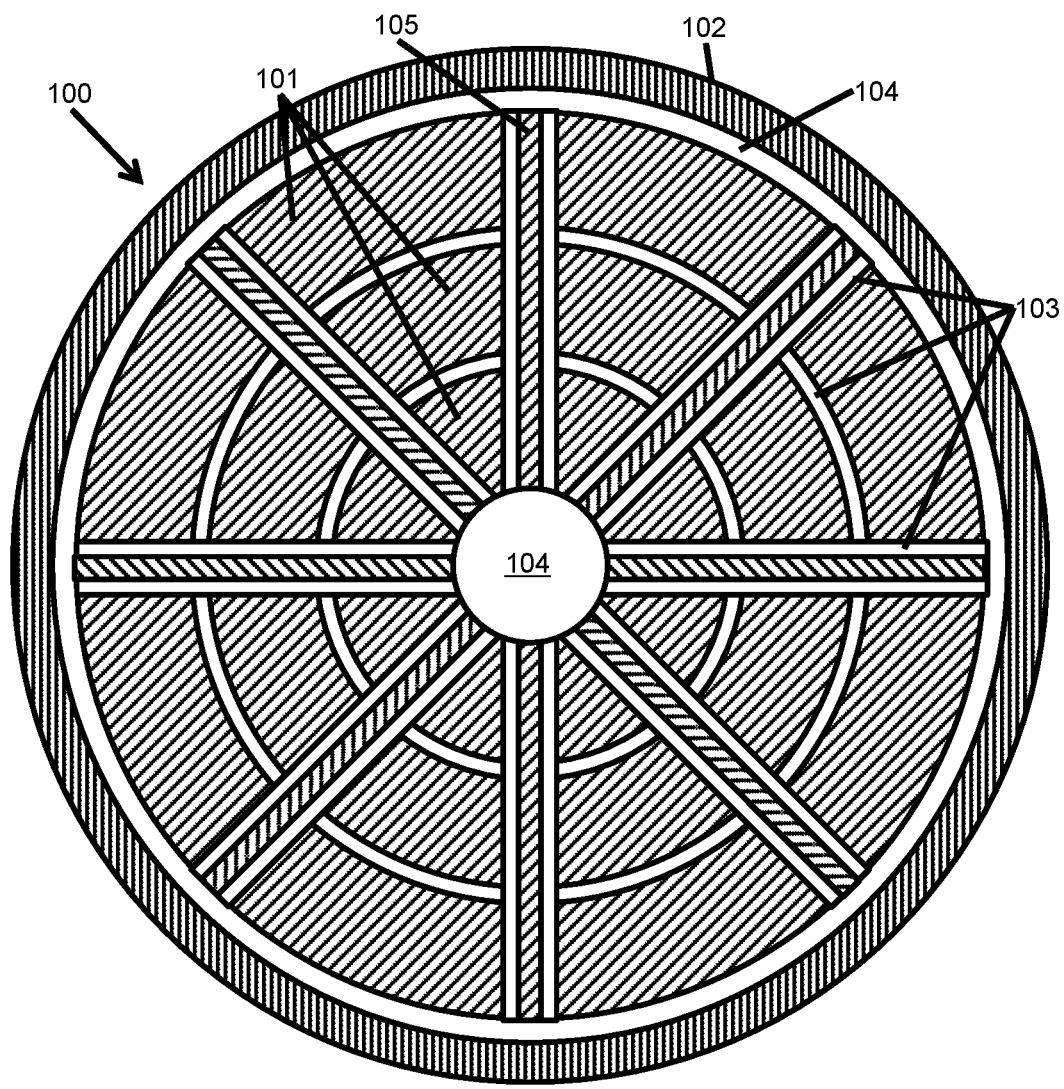
FIG. 1 is a cross section of a conventional central column.

FIG. 2A is a plot based on the arrangement of FIG. 1, where the compressive radial stress is supported by the copper of the column itself. It peaks at 450 MPa on the inside radius. Since the yield stress of full-hard copper is ~350 MPa this is unacceptable.

Figure 2B:
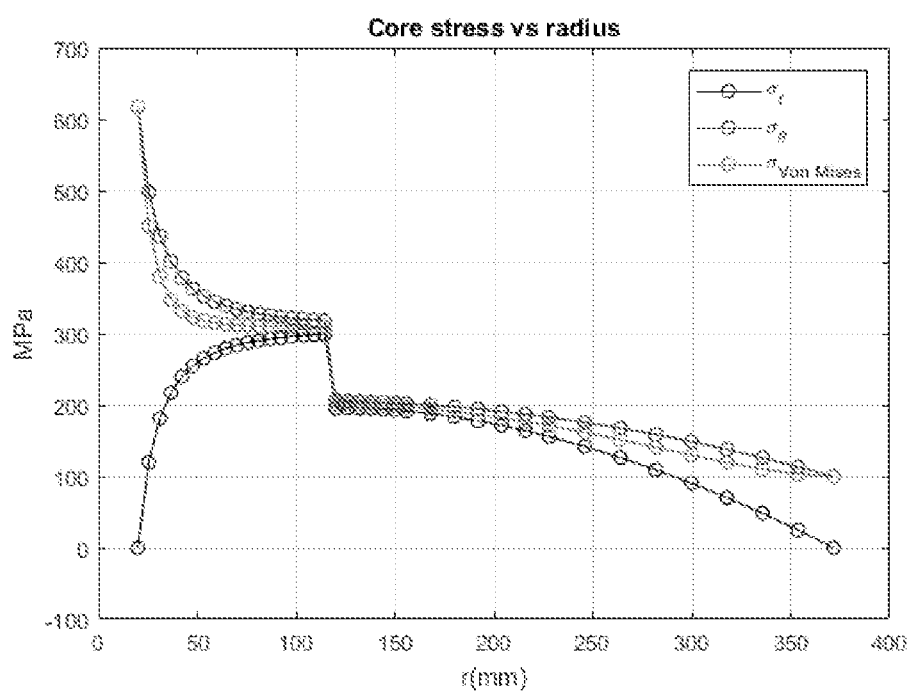
FIG. 2B is a graph of the stress in a central column with a support.

FIG. 2B shows a similar plot for an arrangement in which a 100 mm thick high strength steel (eg: heat treated Inconel 718) support tube or rod is inserted into the central hole. This has yield stress ~1200 MPa, and the Young's modulus and Poisson's ratio for the support tube were taken to be 200 MPa and 0.3 respectively. With the support tube or rod, the peak stress in the copper falls to 200 MPa, which is acceptable for full hard copper.

Figure 3:
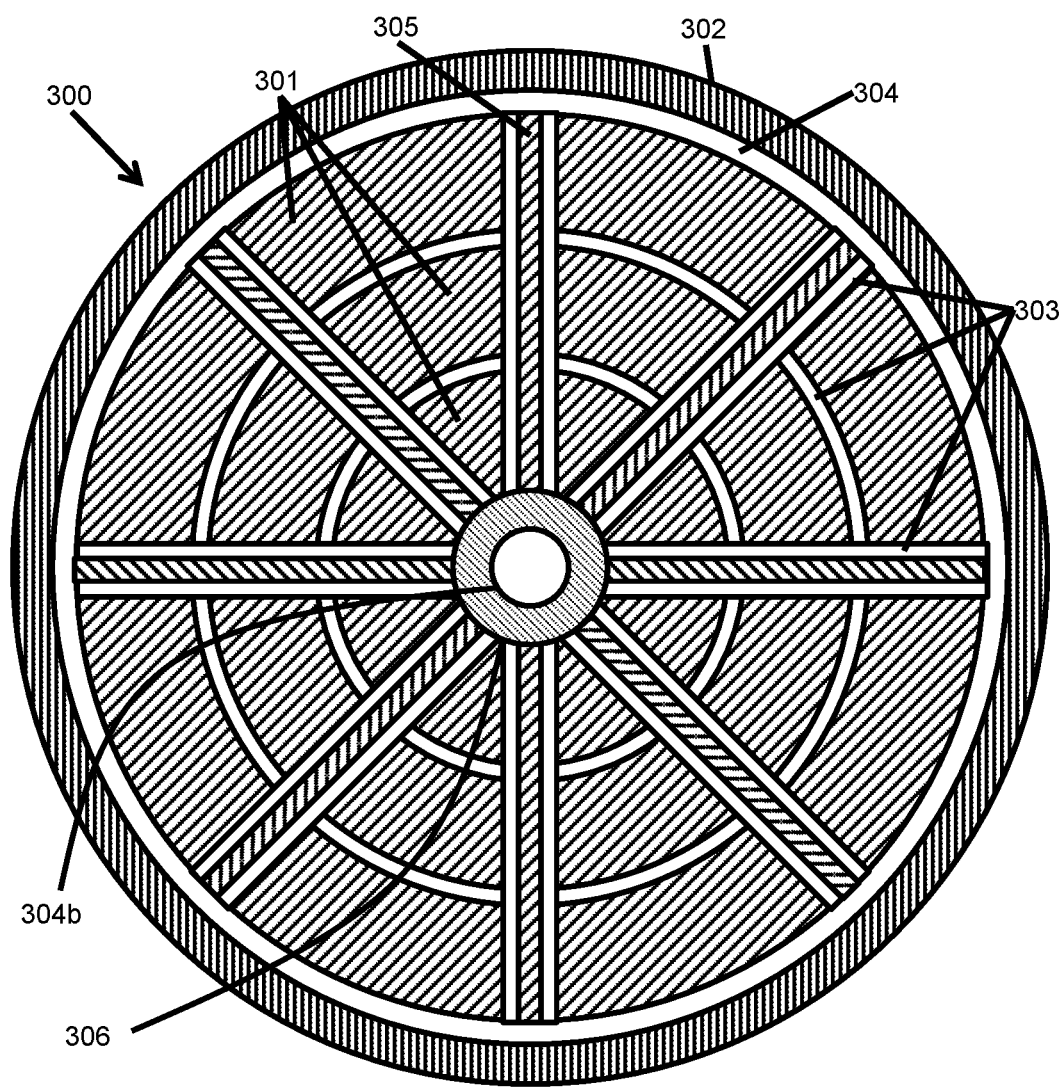
FIG. 3 is a cross section of a central column according to an exemplary construction.

FIG. 3 shows a central column 300, similar to that shown in FIG. 1, but including additional support. The central column 300 includes current carrying elements 301, neutron shielding 302, electrical insulation 303, coolant channels 304, and cooling ribs 305 which are equivalent to those in FIG. 1 except as noted below. A support member 306 is provided along the central axis of the central column. The support member 306 could be formed as a tube (as shown in FIG. 3) or a rod, and is made from a strong material such as steel, Inconel, or titanium so as to bear the stresses in the central column.

The support member 306 is in direct contact with the inner surfaces of the current carrying elements 301. The purpose of the support member is primarily to reduce the hoop and radial stresses in the centre column. The current carrying elements all generate forces acting towards the central axis of the column. These accumulate radially, such that the radial and hoop stresses increase as the distance to the central axis reduces. The addition of a central tube (or rod) of strong, relatively stiff material allows some of this load to be taken by a material chosen for its high structural strength, rather than for its thermal and electrical conductivity.

The fact that the stress in the support element 306 is entirely compressive also means that, in addition to (or instead of) a metal such as steel, Inconel or titanium, a carbon composite or ceramic could be used to form the central support member. Although ceramics are not reliable in tension, they can be used in compression. This potentially makes it possible to use a material such as tungsten carbide which also has neutron shielding properties. Although the primary neutron shield 302 is around the outside of the central column, it can still in some circumstances be helpful to prevent neutrons which have passed through the primary neutron shield and the conductors in one side of the central column from interacting with conductors on the other side. For a ceramic the concept of "yield strength" does not normally apply: in general (for any material) the most important feature is a high compressive strength.

Figure 4:
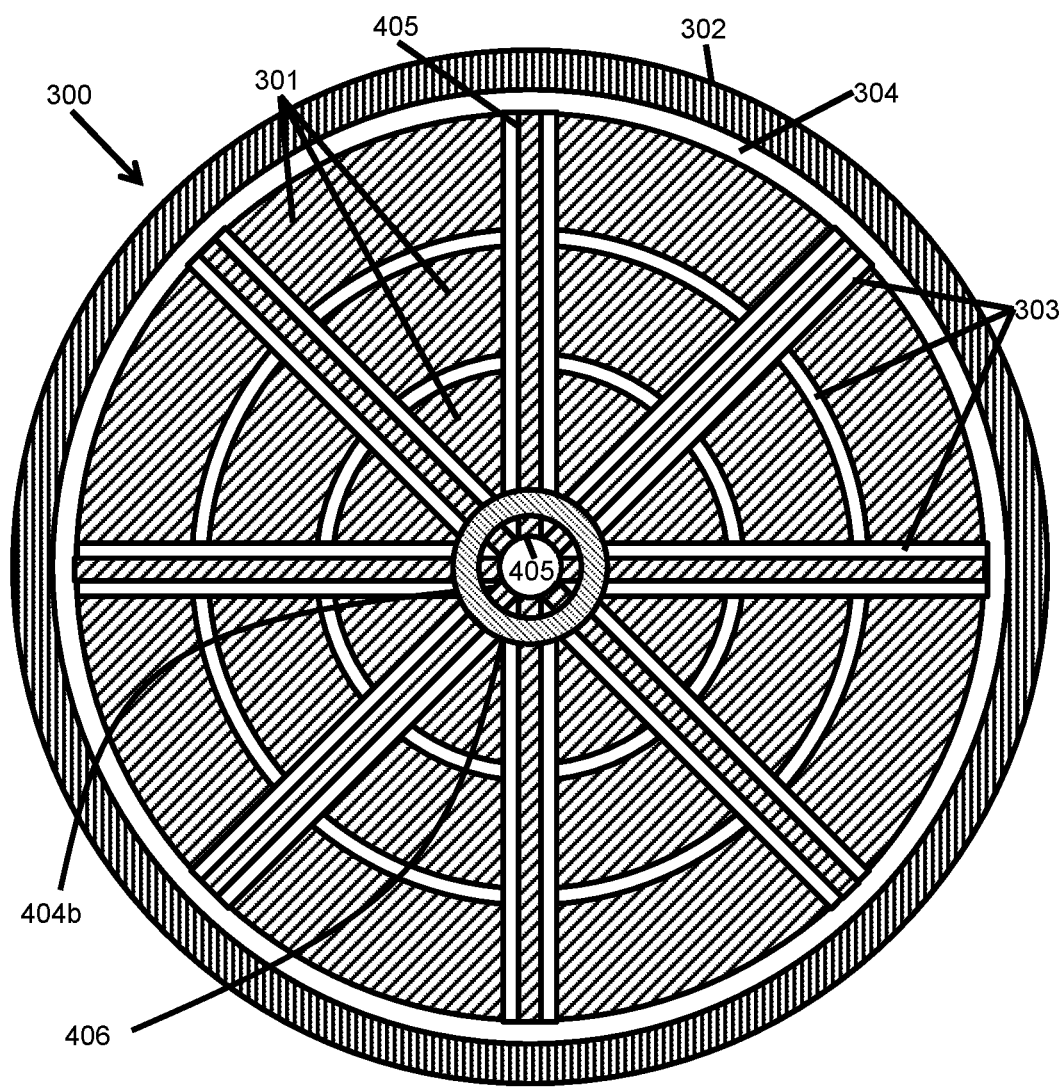
FIG. 4 is a cross section of a central column according to a further exemplary construction.

As mentioned above, the support member 306 may be formed as a solid rod, or alternatively as a tube as shown in FIG. 3. Where the support member 306 is formed as a tube, the bore of the tube may be used as a supplementary cooling channel 304b. This is only practical where the support member is formed of a material having a high thermal conductivity. As a possible alternative shown in FIG. 4, the cooling ribs 405 could be at least partially be extended through the support member 406 to achieve direct thermal contact with the coolant in the coolant channel 404b. The provision of such an arrangement would require balancing the need for thermal transfer with the provision of a sufficiently strong support element.

Similar constructions may be used in central columns which lack insulating layers 303 and/or cooling ribs 305.

The invention claimed is:
1. A central column for a toroidal field coil of a tokamak plasma chamber, the central column comprising:
 a support member extending vertically along a central axis of the central column;
 current carrying elements of the toroidal field coil located radially outward of the support member;
 a coolant channel within the support member;
 electrical insulation around each of the current carrying elements; and
 cooling ribs in thermal contact with the electrical insulation, and extending radially outward from the support member and through the support member into thermal contact with the coolant channel, the cooling ribs comprising an electrically conductive material, wherein the support member is in structural contact with the current carrying elements so as to support them radially against compressive Lorentz stress.

2. A central column according to claim 1, wherein the electrically conductive material comprises a metal.

3. A central column according to claim 2, wherein the metal is copper.

4. A central column for a toroidal field coil of a tokamak plasma chamber, the central column comprising:
- a support member extending vertically along a central axis of the central column;
- current carrying elements of the toroidal field coil located radially outward of the support member;
- a coolant channel within the support member;
- electrical insulation around each of the current carrying elements; and
- cooling ribs in thermal contact with the electrical insulation, and extending radially outward from the support member and through the support member into thermal contact with the coolant channel, the cooling ribs comprising an electrically conductive material;
- wherein the support member is in structural contact with the current carrying elements so as to support them radially against compressive Lorentz stress; and
- wherein the current carrying elements comprise said electrically conductive material.

5. A central column according to claim 4, wherein the electrically conductive material is copper.

* * * * *